Patented May 29, 1945

2,377,297

UNITED STATES PATENT OFFICE 2,377,297

PREPARATION OF FLUORINATED OLEFINS

Newton Lamb, Saginaw, and William C. Mast, Bay City, Mich., assignors to The Dow Chemical Company, Midland, Mich., a corporation of Michigan No Drawing. Application May 27, 1941, Serial No. 395,501

5 Claims. (Cl. 260—653)

This invention relates to the preparation of fluoro-olefins and more particularly to the preparation of monofluoro-olefins and chloro derivatives of the same in which the fluorine atom is attached to an olefinic carbon atom.

These compounds are excellent solvents for fats and waxes, have much lower boiling points than other similar halogen compounds, may in many instances be polymerized to form valuable products, and have other desirable properties.

Heretofore monofluoro-olefins and their chloro or bromo substituted derivatives have been prepared from polychloro- or polybromo-alkanes by fluorinating to replace one halogen atom with fluorine and splitting hydrogen halide or two atoms of halogen from the molecule with alkalies or with finely divided metals, respectively. Although this method has led to fairly satisfactory results in the preparation of bromo-monofluoro-olefins from polybromo-alkanes, it has been less satisfactory for the preparation of chloro-monofluoro-olefins from polychloro-alkanes due to the indifference of chloro-alkanes to fluorinating agents. This indifference is particularly evident when attempts are made to fluorinate chloro-alkanes containing few chlorine substituents, such as ethyl chloride, ethylene dichloride and the like. Even in the fluorination of 1,1,2-trichloro-ethane with the very vigorous fluorinating agent, anhydrous mercuric fluoride, only a 45-50 per cent yield of 1-fluoro-1,2-dichloro-ethane is obtained. In some instances, hydrochloric acid is split from the molecule and unsaturated compounds containing no fluorine are the chief products. Because of these low yields, the preparation of monofluoro-olefins and their chloro derivatives has heretofore been difficult and expensive and these valuable compounds have not attained the widespread usage which their properties would otherwise justify. It is an object of this invention to provide an economical method for preparing monofluoro-olefins and chloro derivatives of the same in good yields and from inexpensive starting materials.

We have found that when a mono- or polychloro-olefin having at least one chlorine atom on an olefinic carbon atom is treated with bromine to form a chloro-dibromo-alkane and the latter is fluorinated with the usual fluorinating agents such as antimony trifluoride, one atom of bromine may be replaced by fluorine to obtain excellent yields of chloro-monobromo-monofluoro-alkanes in which the remaining bromine atom and the fluorine atom are on adjacent carbon atoms with at least one chlorine atom on the same carbon atom as the fluorine. From the latter compound finely divided metals such as zinc readily and preferentially split the bromine atom together with an atom of chlorine from the fluorine bearing carbon atom to form a metal halide and a monofluoro-olefin which will also contain chlorine when a polychloro-alkane is used as starting material. In this manner it is possible to utilize the inexpensive and commercially available chloro-olefins as starting materials and to prepare from them in good yields monofluoro-olefins and their chloro derivatives in which the fluorine atom is on an olefinic carbon atom.

In practicing the invention, the bromination step is carried out in the manner usually followed in the bromination of olefins. The bromine is preferably added gradually and with cooling to the chloro-olefin. In the case of low boiling chloro-olefins such as vinyl chloride, the reaction is conveniently run in a closed reactor under pressure, in which the bromine may be pumped into the reaction vessel containing the olefin. The reaction temperature is usually maintained at room temperature or slightly above, although higher or lower temperatures may be employed. The chloro-dibromo-alkane formed is preferably used directly in the fluorination step of the process without further purification, although purification such as by fractional distillation may be resorted to if desirable.

The fluorination of the chloro-dibromo-alkane is effected by any of the usual fluorinating agents, preferably by antimony trifluoride, since it is convenient to handle and may be caused to react smoothly with the dibromo compound to replace one of the bromine atoms without materially affecting the other one. Other more vigorous fluorinating agents such as anhydrous mercuric fluoride may be used, if desired, but are not usually required. The reaction may conveniently be carried out by warming one molecular proportion of antimony trifluoride together with about three molecular proportions of the chloro-dibromo-alkane in a copper or other suitable reaction vessel. The mixture may be boiled under reflux until the fluorination is substantially complete and then fractionally distilled to recover the chloro-monofluoro-monobromo-alkane, or the latter may be continuously fractionally distilled from the mixture and condensed as it is formed. If desired, the reaction may be effected by warming the materials together in a closed vessel under pressure and the mixture subsequently be fractionally distilled. The reaction temperature will depend upon the particular compound which is being fluorinated, and in the case of reactions carried out at atmospheric pressure will frequently be found to be from 5° to 30° C. above the boiling point of the fluoro compound being prepared. It is helpful, although not necessary, to include a minor proportion of antimony pentachloride in the reaction mixture, since it apparently causes the reaction to proceed more smoothly and at lower temperatures. The time required for complete reaction is dependent upon the reaction temperature, the fluorinating agent used, and the particular chloro-dibromo-alkane being fluorinated, but is usually from 2 to 10 hours.

The splitting of chlorine and bromine from the chloro-monobromo-monofluoro-alkane is preferably accomplished by agitating the latter with a finely divided metal such as zinc in the presence of sufficient water to form a thin mixture. The proportion of water is not critical and may be varied. One advantageous mode of operation is to stir the metal and water together, add the chloro-monobromo-monofluoro-alkane, and separate the monofluoro-olefin formed from the reaction mixture. While zinc is the preferred metal, others such as magnesium may be used, if desired. For complete reaction, about two chemical equivalents of metal are required for each mol of chloro-monobromo-mono-fluoro-alkane, but larger or smaller quantities may be used. The speed of reaction may be increased, particularly in the case of halogenated alkanes which are very insoluble in water, by incorporating alcohol or other mutual solvent in the reaction mixture. The preferred reaction temperature depends upon the particular chloro-bromofluoro-alkane and metal reactants employed. Thus, the reaction between 1-bromo-2,2-dichloro-2-fluoro-ethane and powdered zinc occurs smoothly and rapidly at room temperature with the formation of 2-chloro-2-fluoro-ethylene, while the reaction between 1,2-dichloro-1-bromo-2-fluoro-ethane with zinc to form 1-chloro-2-fluoro-ethylene proceeds smoothly at 80° C. While the reaction may, in most cases, be effected at atmospheric pressure, a closed reaction vessel may, if desirable, be used and the reaction temperature increased to above the boiling temperature of the water. Since the monofluoroolefin product has a boiling point below that of the organic reactant, it is advantageously recovered by distilling it from the reaction mixture as it is formed. Alternatively, the product may be distilled or separated mechanically from the reaction mixture after completion of the reaction. The monofluoro-olefins so obtained may be further purified by any convenient method, such as by fractional distillation.

The following examples described a number of ways in which the principle of the invention has been applied, but are not to be construed as limiting its scope.

*Example 1*

840 grams (8.66 mols) of 1,1-dichloro-ethylene was treated gradually with 1385 grams (8.66 mols) of bromine with gentle refluxing. The resultant product was substantially pure 1,1-dichloro-1,2-dibromo-ethane and weighed 2225 grams (8.66 mols), i. e. a practically quantitat've yield. The 2225 grams of 1,1-dichloro-1,2-dibromo-ethane (8.66 mols) was then mixed with 517 grams 2.89 mols) of antimony trifluoride and 100.6 grams of antimony pentachloride and heated to about 130° C. The 1,1-dichloro-2-bromo-1-fluoro-ethane which was evolved smoothly from the reaction mixture was condensed and collected. Heating was continued for two hours at the end of which time there had been collected 1510 grams (7.78 mols) or a 90.0 per cent yield of 1,1-dichloro-2-bromo-1-fluoro-ethane. 203 grams (3.1 gram atoms) of zinc dust was then stirred with 1000 grams of water and 610 grams (3.1 mols) of the 1,1-dichloro-2-bromo-1-fluoro-ethane was added gradually at room temperature. The 1-chloro-1-fluoro-ethylene which was evolved from the mixture was condensed and collected in a receiver cooled with solid carbon dioxide. After fractional distillation there was obtained 210 grams (2.68 mols) or a yield of 84.5 per cent pure 1-chloro-1-fluoro-ethylene boiling at temperatures between −10° C. and −12° C. The overall yield of pure 1-chloro-1-fluoro-ethylene for the entire process was 76 per cent of the theoretical.

*Example 2*

582 grams (6 mols) of 1,2-dichloro-ethylene was heated to 50° C. and treated gradually with 960 grams (6 mols) of bromine. The 1,2-dichloro-1,2-dibromo-ethane thus obtained weighed 1490 grams (5.8 mols) which amounted to a yield of 96.5 per cent of the theoretical. 2568 grams (10 mols) of 1,2-dichloro-1,2-dibromo-ethane was mixed with 595 grams (3.33 mols) of antimony trifluoride and 119 grams of antimony pentachloride and heated under reflux at 140°–160° C. for 10 hours. Upon fractionally distilling the reacted mixture 535 grams (2.1 mols) of unreacted 1,2-dichloro-1,2-dibromo-ethane was recovered and 1025 grams (5.28 mols) of 1,2-dichloro-1-bromo-2-fluoro-ethane boiling at 123°–127° C. at atmospheric pressure was collected. This was a yield of 67.0 per cent of the theoretical based upon the 1,2-dichloro-1,2-dibromo-ethane consumed. 310 grams (1.60 mols) of the 1,2-dichloro-1-bromo-2-fluoro-ethane, 114 grams (1.74 gram atoms) of powdered zinc and 500 grams of water were stirred together for 7 hours at 80° C. The 1-chloro-2-fluoro-ethylene which volatilized from the mixture was condensed and collected in a receiver cooled with dry ice. After fractional distillation there was obtained 95 grams (1.21 mols) of pure 1-chloro-2-fluoro-ethylene boiling at temperatures between 10° C. and 12° C. This amounted to a yield of 75.5 per cent of the theoretical. The overall yield of pure 1-chloro-2-fluoro-ethylene for the entire process was 48.8 per cent of the theoretical.

Other modes of applying the principle of the invention may be employed instead of those explained, change being made as regards the process herein disclosed, provided the step or steps stated by any of the following claims or the equivalent of such stated step or steps be employed.

We therefore particularly point out and distinctly claim as our invention:

1. In a method of making a monochloro-monofluoro-alkene having the fluorine atom on an unsaturated carbon atom from a dichloro-alkene having at least one chlorine atom on the same unsaturated carbon atom, the steps comprising reacting the dichloro-alkene with about its molecular equivalent of bromine, reacting the formed dibromo-dichloro-alkane with about 0.3 of its molecular equivalent of antimony trifluoride, and reacting the formed dichloro-monobromo-monofluoro-alkane with powdered zinc.

2. In a method of making a monochloro-monofluoro-ethylene from a dichloro-ethylene, the steps which comprise reacting the dichloro-ethylene with about its molecular equivalent of bromine, reacting the formed dibromo-dichloro-ethane with about 0.3 of its molecular equivalent of antimony trifluoride and reacting the formed dichloro - monobromo - monofluoro - ethane with powdered zinc.

3. In a process for making a monochloro-monofluoro-ethylene, the steps comprising reacting a dichloro - monobromo - monofluoro - ethane in which the bromine and fluorine atoms are on different carbon atoms and in which at least one chlorine atom is on the same carbon atom as the fluorine with a metal selected from the group consisting of zinc and magnesium and separating a monochloro-monofluoro-ethylene from the reaction mixture.

4. A method of making 1 - chloro - 2 - fluoro-ethylene comprising adding bromine to 1,2-dichloro-ethylene at a reaction temperature to form 1,2-dichloro-1,2-dibromo-ethane, treating the latter with about 0.3 of its molecular equivalent of antimony trifluoride and a minor proportion of antimony pentachloride at a reaction temperature of from about 140° C. to about 160° C. for about ten hours, fractionally distilling 1,2-dichloro-2-bromo-1-fluoro-ethane from the reaction mixture, treating the distilled 1,2-dichloro-2-bromo-1-fluoro-ethane with an excess of powdered zinc in the presence of water and at a temperature of from about 20° C. to about 100° C., and distilling and condensing 1-chloro-2-fluoro-ethylene from the reaction mixture.

5. A method of making 1-chloro-1-fluoro-ethylene comprising adding bromine to 1,1-dichloro-ethylene at a reaction temperature to form 1,1-dichloro-1,2-dibromo-ethane, treating the latter with about 0.3 of its molecular equivalent of antimony trifluoride and a minor proportion of antimony pentachloride at a reaction temperature of from about 120° C. to about 140° C., fractionally distilling 1,1-dichloro-2-bromo-1-fluoro-ethane from the reaction mixture, treating the distilled 1,1-dichloro-2-bromo-1-fluoro-ethane with an excess of powdered zinc in the presence of water and at about room temperature, and distilling and condensing 1-chloro-1-fluoro-ethylene from the reaction mixture.

NEWTON LAMB.
WILLIAM C. MAST.